United States Patent [19]

Blackwell, deceased et al.

[11] Patent Number: 5,149,749

[45] Date of Patent: Sep. 22, 1992

[54] POLY(PHENYLENE SULFIDE) COMPOSITION AND ARTICLES HAVING IMPROVED THERMAL STABILITY AT HIGH TEMPERATURES

[75] Inventors: Jennings P. Blackwell, deceased, late of Broken Arrow, Okla. by Bruce A. blackwell, executor; Bruce L. Ramsey, Bartlesville, Okla.

[73] Assignee: Phillips Petroleum Company, Bartlesville, Okla.

[21] Appl. No.: 531,321

[22] Filed: May 31, 1990

[51] Int. Cl.$^5$ .................... C08F 283/00; C08G 75/00; C08L 81/00; C08L 77/06

[52] U.S. Cl. ...................................... 525/537; 525/436

[58] Field of Search ................................ 525/436, 537

[56] References Cited

U.S. PATENT DOCUMENTS

| | | | |
|---|---|---|---|
| 3,658,938 | 4/1972 | Kwiatkowski et al. | 260/857 |
| 3,889,038 | 6/1975 | Wiczer | 428/361 |
| 3,919,177 | 11/1975 | Campbell | 528/373 |
| 4,021,596 | 5/1977 | Bailey | 428/375 |
| 4,089,847 | 5/1978 | Edmonds, Jr. et al. | 528/388 |
| 4,116,947 | 9/1978 | Edmonds, Jr. et al. | 528/388 |
| 4,150,003 | 4/1979 | McClain et al. | 260/23 H |
| 4,170,957 | 10/1979 | Eddy et al. | 118/60 |
| 4,365,037 | 12/1982 | Adachi et al. | 524/449 |
| 4,415,729 | 11/1983 | Scoggins et al. | 528/388 |
| 4,426,479 | 1/1984 | Deguchi et al. | 524/430 |
| 4,434,122 | 2/1984 | Reed | 264/211 |
| 4,447,581 | 5/1984 | Quella | 525/189 |
| 4,454,189 | 6/1984 | Fukata | 428/224 |
| 4,472,556 | 9/1984 | Lipowitz et al. | 525/106 |
| 4,528,346 | 7/1985 | Sugie et al. | 525/523 |
| 4,703,081 | 10/1987 | Blackwell et al. | 524/592 |
| 4,708,983 | 11/1987 | Liang | 525/101 |
| 4,931,512 | 6/1990 | Matsumura et al. | 525/535 |
| 4,975,479 | 12/1990 | Satake et al. | 525/537 |
| 4,980,420 | 12/1990 | MacLeay et al. | 525/437 |

*Primary Examiner*—John Kight, III
*Assistant Examiner*—T. Mosley
*Attorney, Agent, or Firm*—Laney, Dougherty, Hessin & Beavers

[57] ABSTRACT

A polymer composition having improved thermal stability at high temperatures. The composition comprises a poly(phenylene sulfide) base resin and a thermal stabilizer selected from the group consisting of polyethersulfone and polyamide-imide, the thermal stabilizer being present in the composition in an amount sufficient to improve the thermal stability of the composition at a temperature of at least 150° C. A method of improving the thermal stability of a poly(phenylene sulfide) resin and articles produced therefrom at high temperatures and an article having improved thermal stability at high temperatures are also provided.

22 Claims, No Drawings

5,149,749

POLY(PHENYLENE SULFIDE) COMPOSITION AND ARTICLES HAVING IMPROVED THERMAL STABILITY AT HIGH TEMPERATURES

BACKGROUND OF THE INVENTION

1. Field of the Invention

This invention relates to thermoplastic polymer compositions. In one aspect, the invention relates to a polymer composition having improved thermal stability at high temperatures. In a second aspect, the invention relates to a method of improving the thermal stability of a poly(arylene sulfide) resin and articles produced therefrom at high temperatures. In a third aspect, the invention relates to articles having improved thermal stability at high temperatures.

2. Description of the Prior Art

Although poly(phenylene sulfide) ("PPS") resins and articles produced therefrom are well known for their stability, strength and resistance to chemicals, they often have insufficient thermal stability at high temperatures. For example, PPS films and fibers tend to degrade upon extended exposure to temperatures of 150° C. and higher. If the service life of PPS articles such as films and fibers at 150° C. and higher could be extended, the utility of the articles would be greatly expanded.

The thermal and oxidative degradation mechanisms of PPS are very complex and are not completely understood, particularly at temperatures ranging from 150° C. to 300° C. Degradation of PPS resins and articles produced therefrom tends to increase with increasing temperatures. It is known that the thermal stability and other physical properties of certain thermoplastic resins can be improved by the addition of various additives thereto. Unfortunately, there are no additives or additive systems that function to improve the thermal stability and other physical properties of all thermoplastic resins. Due to varying mechanisms of thermal and oxidative degradation, the fact that a particular additive or additive system improves certain physical properties of one type of thermoplastic resin does not necessarily make it probable or even likely that the same additive or additive system will improve the same or other physical properties of a different thermoplastic resin. Similarly, the fact that a particular additive or additive system is known to function in a certain way in one resin does not make it probable or even likely that the same additive or additive system will function in different ways in the same or other resins.

By the present invention, it has been discovered that the high temperature thermal stability of PPS resins and articles produced therefrom is greatly improved by adding certain thermal stabilizers thereto.

SUMMARY OF THE INVENTION

In one aspect, the present invention provides a polymer composition having improved thermal stability at high temperatures. The composition comprises a poly(phenylene sulfide) base resin and a thermal stabilizer selected from the group consisting of polyethersulfone and polyamide-imide. The thermal stabilizer is present in the composition in an amount sufficient to improve the thermal stability of the composition at a temperature of at least 150° C.

In a second aspect, the present invention provides a method of improving the thermal stability of a poly(phenylene sulfide) resin and articles produced therefrom at high temperatures. The method comprises the step of admixing with the resin an amount of a thermal stabilizer sufficient to improve the thermal stability of the resin at a temperature of at least 150° C. The thermal stabilizer employed in the method is selected from the group consisting of polyethersulfone and polyamide-imide.

In a third aspect, the present invention provides an article having improved thermal stability at high temperatures. The article is formed of a polymer composition comprising a poly(phenylene sulfide) base resin and a thermal stabilizer selected from the group consisting of polyethersulfone and polyamide-imide. The thermal stabilizer of the polymer composition is present in the composition in an amount sufficient to improve the thermal stability of the article at a temperature of at least 150° C. In one embodiment, the article is a film. In another embodiment, the article is a fiber.

It is, therefore, an object of the present invention to provide a polymer composition having improved thermal stability at temperatures of 150° C. and higher.

It is an object of the invention to provide a method of improving the thermal stability of a poly(phenylene sulfide) resin and articles produced therefrom at temperatures of 150° C. and higher.

It is a further object of the present invention to provide poly(phenylene sulfide) articles such as films and fibers that have improved thermal stability at temperatures of 150° C. and higher.

Other and further objects, features and advantages of the present invention will be readily apparent to those skilled in the art upon a reading of the following description of the preferred embodiments of the invention.

DETAILED DESCRIPTION OF THE PREFERRED EMBODIMENTS

In a first aspect, the present invention provides a polymer composition having improved thermal stability at high temperatures. The composition comprises a poly(phenylene sulfide) ("PPS") base resin and a thermal stabilizer selected from the group consisting of polyethersulfone and polyamide-imide. The thermal stabilizer is present in the composition in an amount sufficient to improve the thermal stability of the composition at a temperature of at least 150° C.

The PPS base resin of the inventive composition is preferably meltable without substantial decomposition and preferably has a flow rate in the range of from about 5 to about 500 g/10 min. as determined by ASTM D-1238, Procedure B-Automatically Time Flow Rate Measurement, Condition 315/5.0, with a 5 minute preheat. More preferably, the PPS base resin has a flow rate in the range of from about 10 to about 300 g/10 min., even more preferably a flow rate in the range of from about 20 to about 200 g/10 min., as determined by the above method. The PPS base resin is preferably linear or branched with no substantial amount of high temperature air curing. This type of resin is very suitable for forming articles such as fibers and films. The PPS base resin preferably comprises at least about 90% by weight of poly(p-phenylene sulfide) repeat units with up to about 10% by weight of one or more of 4,4'-biphenylene sulfide repeat units meta-oriented phenylene sulfide repeat units and ortho-oriented phenylene sulfide repeat units.

The PPS base resin can be prepared by any technique. It is preferably prepared by methods such as the methods described in U.S. Pat. Nos. 3,919,177, 4,089,847, 4,415,729 and 4,116,947, the disclosures of which are incorporated by reference herein. At the present time, the PPS base resin is most preferably prepared by the method described in U.S. Pat. No. 3,919,177. PPS resins that are particularly suitable for use as the base resin of the inventive composition are marketed by Phillips 66 Company under the trademarks RYTON ® PR09 and RYTON ® PR10.

The inventive polymer composition is particularly suitable for forming articles such as films and fibers. The thermal stabilizer of the composition functions to improve the thermal stability of articles such as films and fibers without deteriorating the strength thereof.

The polyethersulfone employed as the thermal stabilizer is preferably a transparent, amorphous, high performance engineering thermoplastic having, as an unfilled resin, a glass transition temperature (Tg) of about 220°-230° C. A polyethersulfone that is particularly suitable for use as the thermal stabilizer of the inventive composition is marketed by ICI Americas, Inc. under the trade name VICTREX.

The polyamide-imide employed as the thermal stabilizer is preferably an amorphous engineering plastic produced by the condensation of trimetallic anhydride and various aromatic diamines. As an unfilled resin, the polyamide-imide preferably is an amorphous polymer with a glass transition temperature (Tg) of about 275° C. A polyamide-imide that is particularly suitable for use as the thermal stabilizer of the composition is marketed by Amoco Performance Products, Inc. under the trade name TORLON. Preferably, the thermal stabilizer of the inventive polymer composition is a polyethersulfone.

The thermal stabilizer is employed in an amount sufficient to significantly improve the thermal stability of the composition at a temperature of at least 150° C., preferably at least 180° C., without significantly reducing other physical properties (e.g., impact strength) of the composition. Preferably, the thermal stabilizer is present in the composition in an amount in the range of from about 0.1% to about 10%, more preferably in an amount in the range of from about 0.5% to about 5%, by weight of the composition. Most preferably, the thermal stabilizer is present in the composition in an amount of about 1.0% by weight of the composition.

It is believed that the effectiveness of the thermal stabilizer of the inventive composition is most pronounced in the absence of fillers or reinforcing agents, particularly in fiber and film applications. However, in some applications, fillers and reinforcing agents can be employed in the composition. Suitable fillers include titania, zinc oxide, silica and the like. Other additives that can be employed include processing aids, pigments, stabilizers and other components conventionally employed in PPS resins, particularly other components conventionally employed in such resins that are formed into films and fibers. Suitable reinforcing agents include glass, carbon and aramid fibers.

In a second aspect, the present invention comprises a method of improving the thermal stability of a PPS resin and articles produced therefrom at high temperatures, i.e., a method of forming the inventive polymer composition. The method comprises the step of admixing with the resin an amount of a thermal stabilizer sufficient to improve the thermal stability of the base resin at a temperature of at least 150° C., the thermal stabilizer being selected from the group consisting of polyethersulfone and polyamide-imide.

The PPS resin and thermal stabilizer employed in the method are the PPS resin and thermal stabilizer of the inventive composition. The thermal stabilizer is preferably admixed with the resin in an amount such that it is present in the resulting mixture in a concentration in the range of from about 0.1% to about 10%, more preferably in the range of from about 0.5% to about 5%, by weight of the mixture. Most preferably, the thermal stabilizer is admixed with the resin in an amount such that it is present in the resulting mixture in a concentration of about 1.0% by weight of the mixture.

The order of addition of the components is not important and any known means of blending the components can be used. Preferably, dry ingredients are admixed by tumbling or a similar technique and are subsequently extruded. The extrudate is either chopped into pellets or ground to form a substantially homogenous powder. The pellets or powder can then be reheated for molding or extrusion.

In a third aspect, the present invention provides an article having improved thermal stability at high temperatures. The article is formed of the inventive polymer composition. The thermal stabilizer of the composition improves the thermal stability of the article at a temperature of at least 150° C. The article can be an article such as a compound, composite, prepreg, laminate, film or fiber. Preferably, the article is a film or fiber. The effect of the thermal stabilizer of the inventive composition is most pronounced when the composition is used to form films and fibers. Films and fibers made of PPS are particularly vulnerable to high temperature degradation because of the large surface area exposed to air and heat and because they cannot be easily reinforced or filled. Generally, the thermal resistance of PPS films and fibers is marginal or inconsistent at temperatures of 150° C. and higher. As shown by the Example below, PPS film formed in accordance with the present invention has improved thermal stability at temperatures at least as high as 220° C.

The following Example is provided to illustrate the composition, method and article of the present invention.

EXAMPLE

Tests were carried out to determine the effectiveness of polyethersulfone and polyamide-imide in improving the high temperature thermal stability of poly(phenylene sulfide) resin (PPS).

The PPS employed in the tests was a branched PPS prepared by the method described in U.S. Pat. No. 3,919,177 with 1,2,4-trichlorobenzene added as a branching agent. This resin is sold by Phillips 66 Company under the trademark RYTON ® PR09. It has a flow rate of approximately 75 g/10 min. as determined by ASTM D-1238, Procedure B-Automatically Time Flow Rate Measurement, Condition 315/5.0, with a 5 minute preheat.

The polyethersulfone employed in the tests is marketed by ICI Americas, Inc. under the trade name VICTREX. The polyamide-imide is marketed by Amoco Performance Products, Inc. under the trade name TORLON.

The polyethersulfone and polyamide-imide were tested for their effectiveness in improving the high temperature thermal stability of PPS by forming PPS films having the additives incorporated therein and thermally aging the films to their points of embrittlement. The times required to age the films to their points of embrittlement are indicative of the thermal stabilities of the films. The times to embrittlement for the films containing the additives were compared to the time to embrittlement for a PPS film without a thermal stabilizer incorporated therein.

First, PPS compositions containing the additives were prepared by tumble mixing approximately 3 grams of each additive with approximately 297 grams of the PPS in a plastic bag. The compositions containing the additives and a 300 gram portion of a composition containing only PPS were then extruded into pellets with a 25.4 mm diameter NRM extruder operating at 100 rpm with a barrel temperature of 315° C. Thereafter, each group of pellets was compression-molded into 178 mm by 178 mm films at 315° C. with a 0.076 mm thick "picture-frame" mold. Each film was quenched in ice water, heat-set for approximately 10 minutes at 225° C. while clamped at the film edges in a "picture-frame" holder to prevent shrinkage, cooled, and cut into three one-inch wide strips.

The strips were then clamped onto wire rods and suspended in a circulating air oven maintained at 220° C. The number of days required to age the strips to their points of embrittlement (failure) was recorded. The points of embrittlement of the strips were determined by periodically subjecting the strips to a roll test. A roll test is carried out by placing a strip on a flat surface and covering one end of the strip with the left index finger. The strip is then curled over the finger with the right hand and rolled back over the finger for the complete length of the strip, keeping it at approximately the same height as the finger. If the film has reached its point of embrittlement, it will break during the rolling process. Breaks near the ends of the strip were not counted if the rest of the strip was flexible since irregularities at the ends may have been caused by clamping the strips onto the rods. The results were averaged for each film.

The results of the tests are shown in Table I below:

TABLE I

| Effectiveness of Thermal Stabilizers in Increasing PPS Film Life at High Temperatures | | |
|---|---|---|
| Test No. | Thermal Stabilizer* | PPS Film Life** (Days)*** |
| 1 | None | 11 |
| 2 | Polyethersulfone | 24 |
| 3 | Polyamide-imide | 22 |

*Each additive was employed in an amount of 1.0% by weight of the polymer composition.
**The film-life was determined by oven-aging the films to embrittlement.
***The results were averaged from three tests conducted for each film.

The tests show that both polyethersulfone and polyamideimide substantially improve the thermal stability of PPS film at 220° C. The polyethersulfone increased the life of the film by 13 days while the polyamide-imide increased the life of the film by 11 days.

The preceding example can be repeated with similar success by substituting the generically or specifically described reactants and/or operating conditions of this invention for those used in the Example.

From the foregoing description, one skilled in the art can easily ascertain the essential characteristics of the invention, and without departing from the scope and spirit thereof, can make various changes and modifications of the invention to adapt it to various usages and conditions.

What is claimed is:

1. A polymer composition for forming films and fibers having improved thermal stability at high temperatures, said composition consisting essentially of:
   a poly(phenylene sulfide) base resin having at least about 90% by weight of poly(p-phenylene sulfide) repeat units and a melt flow in the range of from about 10 to about 300 g/10 minutes as determined by ASTM D-1238, Procedure B-Automatically Time Flow Rate Measurement, Condition 315/5.0, with a 5 minute preheat; and
   a thermal stabilizer selected from the group consisting of polyethersulfone and polyamide-imide for increasing the thermal stability of the films and fibers at a temperature of at least 150° C. without deteriorating the strength thereof, said thermal stabilizer being present in the composition in an amount in the range of from about 0.5% to about 5% by weight of the composition.

2. The composition of claim 1 wherein said poly(phenylene sulfide) base resin has no substantial amount of high temperature air curing and a melt flow in the range of from about 20 to about 200 g/10 minutes as determined by ASTM D-1238, Procedure B-Automatically Time Flow Rate Measurement, Condition 315/5.0, with a 5 minute preheat.

3. The composition of claim 1 wherein said thermal stabilizer is present in said composition in an amount of about 1.0% by weight of said composition.

4. The composition of claim 1 wherein said thermal stabilizer is polyethersulfone.

5. The composition of claim 1 wherein said thermal stabilizer is polyamide-imide.

6. A film formed of the composition defined in claim 1.

7. A fiber formed of the composition defined in claim 1.

8. A method of improving the thermal stability of films and fibers produced from a poly(phenylene sulfide) resin having at least about 90% by weight of poly(p-phenylene sulfide) repeat units at high temperatures comprising:
   admixing with said resin in the range of from about 0.5% to about 5% by weight, based on the total weight of the mixture, of a thermal stabilizer for increasing the thermal stability of the films and fibers at a temperature of at least 150° C. without deteriorating the strength thereof, said thermal stabilizer being selected from the group consisting of polyethersulfone and polyamide-imide.

9. The method of claim 8 wherein said poly(phenylene sulfide) base resin has no substantial amount of high temperature air curing and a melt flow in the range of from about 20 to about 200 g/10 minutes as determined by ASTM D-1238, Procedure B-Automatically Time Flow Rate Measurement, Condition 315/5.0, with a 5 minute preheat.

10. The method of claim 8 wherein said thermal stabilizer is admixed with said resin in an amount such that it is present in the resulting mixture in a concentration of about 1.0% by weight of the mixture.

11. The method of claim 8 wherein said thermal stabilizer is polyethersulfone.

12. The method of claim 8 wherein said thermal stabilizer is polyamide-imide.

13. A film formed in accordance with the method of claim 8.

14. A fiber formed in accordance with the method of claim 8.

15. A film having improved thermal stability at high temperatures, said film being formed of a polymer composition consisting essentially of:
   a poly(phenylene sulfide) base resin having at least about 90% by weight of poly(p-phenylene sulfide) repeat units and a melt flow in the range of from about 10 to about 300 g/10 minutes as determined by ASTM D-1238, Procedure B-Automatically Time Flow Rate Measurement, Condition 315/5.0, with a 5 minute preheat; and
   a thermal stabilizer selected from the group consisting of polyethersulfone and polyamide-imide for increasing the thermal stability of the film at a temperature of at least 180° C. without deteriorating the strength thereof, said thermal stabilizer being present in the composition in an amount of about 1.0% by weight of the composition.

16. The film of claim 15 wherein said poly(phenylene sulfide) base resin of said polymer composition has no substantial amount of high temperature air curing and a melt flow in the range of from about 20 to about 200 g/10 minutes as determined by ASTM D-1238, Procedure B-Automatically Time Flow Rate Measurement, Condition 315/5.0, with a 5 minute preheat.

17. The film of claim 15 wherein said thermal stabilizer of said polymer composition is polyethersulfone.

18. The film of claim 15 wherein said thermal stabilizer of said polymer composition is is polyamide-imide.

19. A fiber having improved thermal stability at high temperatures, said fiber being formed of a polymer composition consisting essentially of:
   a poly(phenylene sulfide) base resin having at least about 90% by weight of poly(p-phenylene sulfide) repeat units and a melt flow in the range of from about 10 to about 300 g/10 minutes as determined by ASTM D-1238, Procedure B-Automatically Time Flow Rate Measurement, Condition 315/5.0, with a 5 minute preheat; and
   a thermal stabilizer selected from the group consisting of polyethersulfone and polyamide-imide for increasing the thermal stability of the fiber at a temperature of at least 180° C. without deteriorating the strength thereof, said thermal stabilizer being present in the composition in an amount of about 1.0% by weight of the composition.

20. The fiber of claim 19 wherein said poly(phenylene sulfide) base resin of said polymer composition has no substantial amount of high temperature air curing and a melt flow in the range of from about 20 to about 200 g/10 minutes as determined by ASTM D-1238, Procedure B-Automatically Time Flow Rate Measurement, Condition 315/5.0, with a 5 minute preheat.

21. The fiber of claim 19 wherein said thermal stabilizer of said polymer composition is polyethersulfone.

22. The fiber of claim 19 wherein said thermal stabilizer of said polymer composition is polyamide-imide.

* * * * *